United States Patent [19]

Morsani et al.

[11] 4,112,619
[45] Sep. 12, 1978

[54] GROW-POT

[76] Inventors: Rosemary Morsani, 14 Palm Point Dr., Jupiter, Fla. 33458; Edwin G. Nelson, 310 Walton Blvd., West Palm Beach, Fla. 33405

[21] Appl. No.: 704,643

[22] Filed: Jul. 12, 1976

[51] Int. Cl.² .............................................. A01G 9/02
[52] U.S. Cl. .......................................... 47/66; 47/85
[58] Field of Search .................. 47/25, 26, 14, 15, 16, 47/40, 59–79, 80, 81, 82, 83, 84, 85–87

[56] References Cited

U.S. PATENT DOCUMENTS

| | | | |
|---|---|---|---|
| 53,477 | 3/1866 | Perry | 47/85 |
| 109,098 | 11/1870 | Adams | 47/25 |
| 155,525 | 9/1874 | Landers | 47/67 |
| 473,836 | 4/1892 | Goodacre | 47/73 |
| 592,066 | 10/1897 | Simpson | 47/73 |
| 1,031,713 | 7/1912 | Hills | 47/73 |
| 1,317,569 | 9/1919 | Forster | 47/79 |
| 1,635,498 | 7/1927 | Pershing | 47/82 |
| 2,113,888 | 4/1928 | Kaparin | 47/71 |
| 2,810,235 | 10/1957 | Magid | 47/81 |
| 3,063,196 | 11/1962 | Pauer | 47/82 |
| 3,154,884 | 11/1964 | Amar et al. | 47/74 X |
| 3,828,473 | 8/1974 | Morey | 47/77 |
| 3,830,015 | 8/1974 | Belgiorno | 47/73 |
| 3,846,936 | 11/1974 | Kelly | 47/73 |
| 3,896,587 | 7/1975 | Insalaco | 47/66 |
| 4,035,951 | 7/1977 | Dedolph | 47/67 X |

FOREIGN PATENT DOCUMENTS

| | | | |
|---|---|---|---|
| 29,425 | 8/1907 | Austria | 47/80 |
| 245,312 | 6/1965 | Austria | 47/63 |
| 1,133,034 | 3/1957 | France | 47/81 |
| 262,614 | 7/1913 | Fed. Rep. of Germany | 47/72 |
| 874,221 | 7/1953 | Fed. Rep. of Germany | 47/66 |

Primary Examiner—Edgar S. Burr
Assistant Examiner—James R. Feyrer
Attorney, Agent, or Firm—Jack N. McCarthy

[57] ABSTRACT

A grow-pot has one or more tubular members located therein for dividing the pot into a plurality of growing volumes. These tubular members can be segmented for easy removal and the bottom of the grow-pot is provided with means for holding the bottom of the tubular member in place. A clamping means can be positioned at the top of a segmented tubular member to maintain it in place.

13 Claims, 6 Drawing Figures

GROW-POT

BACKGROUND OF THE INVENTION

The present invention relates to a grow-pot and relates more specifically to a pot or container for controlling plant growth in a growing media, or mixture.

DESCRIPTION OF THE PRIOR ART

In the past, transplanting, or potting, has been done manually by transferring the plant, or shrub, from one size pot to another size pot, or from a transplanting tube into the ground, risking the possibility of root shock. Prior art patents involving transplanting devices and methods are shown in U.S. Pat. Nos. 78,233; 404,585; 788,319; 1,425,588; 1,548,283 and 1,846,980. These patents are basically used in physically moving a plant from one area to another and this is not required in the device disclosed.

SUMMARY OF THE INVENTION

The principal object of the present invention is to provide a grow-pot for nurserymen, or gardeners, of the type described, which is provided with a plurality of growing volumes which are separated by removable walls to provide the correct pot size during the stages of a plant's growth which involves the containing of the growing roots.

Another object of this invention is to provide a grow-pot having an outer pot with one or a plurality of inner tubular members which are positioned on one end within the outer pot to divide the grow-pot into a plurality of nested or ring-like growing volumes, extending from the center of the grow-pot to the outer wall thereof with the bottom of the outer pot having means for holding one end of the tubular member or members.

A further object of this invention is to provide a grow-pot with one or more inner tubular members to provide a plurality of nested growing volumes wherein each growing volume can contain a different type of growing material or mixture as required for growth.

DESCRIPTION OF THE PREFERRED EMBODIMENT AND MODIFICATION

Figure 1:
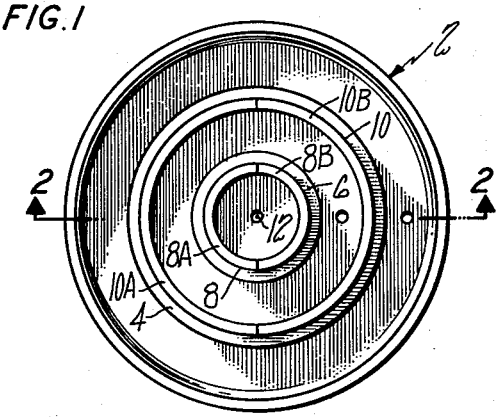
FIG. 1 is a plan view of one embodiment of the grow-pot showing a cover.
Figure 6:
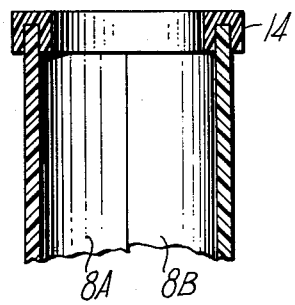
FIG. 6 is a fragmentary view of the top of a segmented tubular member with a holding ring.
Figure 2:
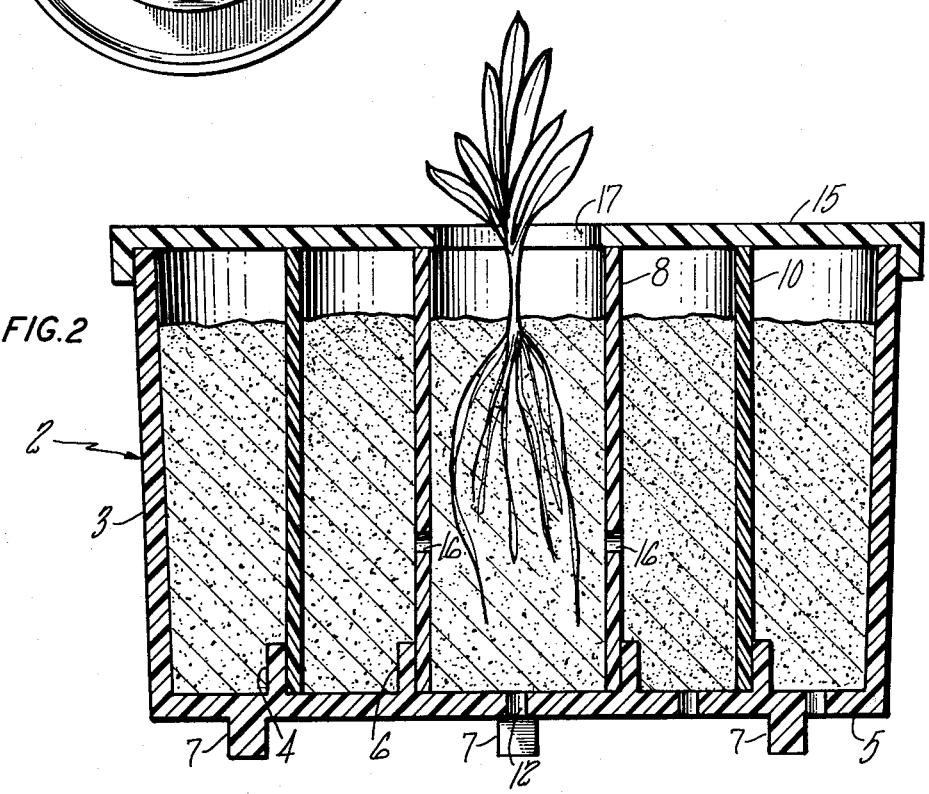
FIG. 2 is a view taken along the line 2—2 of FIG. 1 not showing the cover.

As shown in FIGS. 1 and 2, the grow-pot comprises a large outer pot 2 with a continuous side wall 3 and a bottom 5 having two upstanding annular projections 4 and 6 from the bottom thereof, each of the rings shown being concentric with the circular bottom of the pot. Lugs 7, or a downwardly projecting ring, can be put on the bottom to space the bottom from a shelf or stand. An inner removable tubular member, or pot, 8 is shown as cylindrical, and is positioned to fit snugly into the smaller annular projection 6 against the bottom of the outer pot 2 and a second inner removable tubular member, or pot, 10, also shown as cylindrical, is positioned to fit snugly into the larger annular projection 4 against the bottom of the outer pot 2. For ease of removal, each of the cylindrical members, or pots, 8 and 10, are made of two semi-circular halves, 8A and 8B and 10A and 10B. While two halves are shown, other numbers of sections can be used. Further, while the projections 4 and 6, and the tubular members 8 and 10, are shown as annular and cylindrical, other shapes can be used, such as oval or rectangular.

Figure 3:
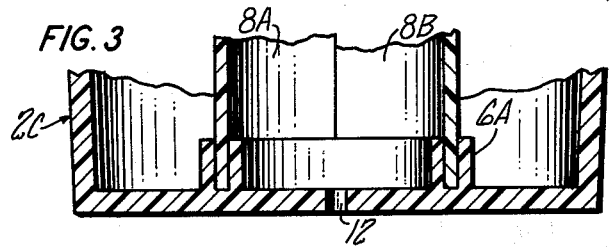
FIG. 3 is a fragmentary view of a modification of the bottom of a grow-pot.

It can be seen from FIG. 3 that the grow-pots can also be made with just one inner removable cylindrical member, or pot, 8, also shown formed of two semi-circular halves 8A and 8B. In this modification, the annular projection means 6A on the bottom of the outer pot 2C is formed of two annular projections spaced closely together to provide just enough space for the bottom of the inner removable cylindrical member, or pot, formed by the sections or halves, 8A and 8B.

In both of the pots 2 and 2C, the center of the bottom has a drain opening 12. Other drain openings can be placed where necessary. It is to be understood that where the inner removable cylindrical or tubular members are formed of a plurality of sections, a holding or clamping means, 14, can be used at the top, such as a collar, or an elastic band can be placed around the tops of the cooperating sections (see FIG. 5). The collar can also be made as a split ring or of two halves for easy removal, the two halves being placed on the segments so that the separating point does not coincide with that of the segmented tubular member. A cover 15 could also be used to hold the tubular member in place. An opening 17 could be placed in the cover 15 to open into the inner tubular member, or pot, being used.

Figure 4:
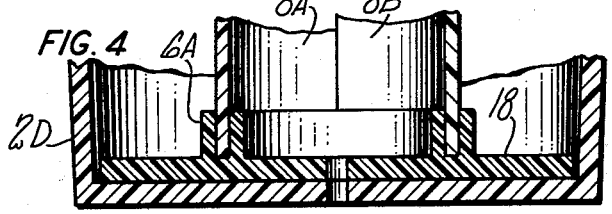
FIG. 4 is another modification of the bottom of a grow-pot.

It can be seen from FIG. 4 that a plate member 18 can be placed in the bottom of an outer pot 2D to convert a present-day pot into this type of grow-pot. The plate member 18 can be formed with a single annular projection, such as shown in FIG. 2, or can be provided with a projection means 6A, such as shown in FIG. 3, having the two annular projections spaced to receive the bottom of an inner removable tubular member.

Figure 5:
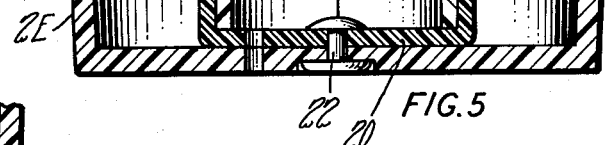
FIG. 5 is another modification of the bottom of a grow-pot.

It can be seen from FIG. 5 that the upstanding annular projections 6, extending from the bottom of an outer pot 2E, can be formed by having a separate member 20 fixed to the bottom of the pot, such as by rivets 22. While they are shown riveted, other attachment means can be used, such as glues or bonding.

The parts of the grow-pot can be formed of many materials which are impervious to the growing media or mixture and the nutrients periodically applied to the mixture. Any suitable plastic material having these characteristics is suitable, and polyethelene is one of these.

Openings 16 are located near the bottom of the tubular member, or pot, 8, to permit moisture to pass from the growing media, or mixture, between the tubular members, or pots, 8, and 10. Similar holes could be placed in the tubular member 10, if desired.

Where many plants are being potted and watered, the outer pot and the inner tubular members, or pots, can be made of different colors for ease of identification and can be used to instruct a worker; for example, "Water the yellow pots today, and remove the green pots on Tuesday." Further, the outer pot 2 can have hanging means capable of being fixed thereto so that the outer pot can be made a hanging planter with only one outer pot being needed from a seed or seedling, to a hanging planter, with the plant having had a controlled growth to obtain the desired results.

The walls of the removable tubular members, or pots, can be made with a slight taper inwardly from the top to the bottom to facilitate their removal from the soil, or growing media, or mixture, being used. The members could also be coated to allow ease of removal.

It is to be understood that a large fixed pot can be used, divided into a plurality of compartments with inner removable tubular members, or pots, 8, being placed in each of the plurality of compartments.

We claim:

1. A grow-pot for growing plants comprising an outer pot having a first side wall with a bottom wall for containing the roots of a plant in a growing mixture, a tubular member having a second side wall with a top end and a bottom end, said second side wall being open at each end, said bottom end having no bottom wall, guide means on said bottom wall of said outer pot, said second side wall being smaller than said first side wall to be positioned in said outer pot with said bottom open end of said second side wall positioned in said guide means on the bottom wall, said guide means being spaced inwardly from the first side wall of said outer pot with said second side wall providing a smaller sized pot within said outer pot for initially containing the roots of a plant in a growing mixture during its early growth, said second side wall comprising a plurality of lengthwise segments for ease of removal from a growing mixture, said lengthwise segments having top and bottom ends, said guide means on said bottom wall of said outer pot for locating and supporting the bottom ends of said lengthwise segments of said second side wall at its position spaced inwardly from the first side wall, said lengthwise segments being longitudinally slideable with respect to each other when supported by said guide means.

2. The combination as set forth in claim 1 wherein said guide means comprises a groove for slideably receiving the bottom ends of said lengthwise segments of said second side wall.

3. The combination as set forth in claim 1 wherein said guide means comprises upstanding projection means into which the bottom end of each lengthwise segment of said second side wall slideably fits for easy direct upward removal of each lengthwise segment of said second side wall from within said first side wall.

4. The combination as set forth in claim 1 wherein holding means are positioned at the top ends of the lengthwise segments of the second side wall.

5. The combination as set forth in claim 1 wherein said guide means is a plate member positioned on the bottom wall of the outer pot, said plate member having means for locating and supporting the bottom end of each lengthwise segment of said second side wall.

6. The combination as set forth in claim 5 wherein said means for locating and supporting said lengthwise segments of said second side wall comprises upstanding projection means into which the bottom end of each lengthwise segment of said second side wall slideably fits for locating and supporting it and for easy removal thereof.

7. The combination as set forth in claim 5 wherein said plate member is fixed to the bottom wall of said outer pot.

8. The combination as set forth in claim 1 wherein a first growing mixture is located between said first side wall and second side wall, a second growing mixture is located within said second side wall, said second side wall extending above the second growing mixture in said second side wall and the first growing mixture between said second side wall and said first side wall.

9. The combination as set forth in claim 1 including a second tubular member having a third side wall with a top end and a bottom end, said third side wall being open at each end, said bottom end of said third side wall having no bottom wall, second guide means on said bottom wall, said third side wall being positioned in said outer pot with said bottom open end of said third side wall positioned in said second guide means on the bottom wall, said second guide means being spaced between the first side wall and said first named guide means with said third side wall providing an intermediate sized pot within said outer pot for intermediately containing the root of a plant in a growing mixture after its early growth in said second side wall, said third side wall comprising a plurality of second lengthwise segments for ease of removal from a growing mixture, said second lengthwise segments having top and bottom ends, said second guide means on the bottom wall of said outer pot for locating and supporting the bottom ends of said second lengthwise segments of said third side wall at its position spaced between the first side wall and second side wall, said second lengthwise segments being longitudinally slideable with respect to each other when supported by said second guide means.

10. The combination as set forth in claim 1 wherein said second side wall thickness has a slight taper inwardly to further facilitate removal through a growing mixture.

11. The combination as set forth in claim 1 wherein said lengthwise segments of said second side wall are positioned substantially at right angles to the bottom wall, said guide means having a guide surface extending from said bottom wall at right angles thereto for supporting said lengthwise segments of said second wall, said lengthwise segments of said second side wall being guided for removal at said right angle position in said guide means.

12. A method for growing plants comprising the following steps:
(a) forming a pot having a first side wall and a bottom wall;
(b) forming a second side wall smaller than said first side wall;
(c) placing said second side wall within said first side wall dividing said pot into a plurality of volumes, one within the other;
(d) placing a growing mixture within each of said volumes;
(e) subsequently placing a seed or seedling in the growing mixture within said second side wall while said second side wall is positioned within said first side wall;
(f) allowing the seed or seedling to grow while containing the root growth within said second side wall for a desired length of time; and
(g) removing said second side wall without moving said root structure to permit said root structure to grow into the growing mixture placed in the outer volume.

13. A method for growing plants comprising the following steps:
(a) forming a pot having a first side wall and a bottom wall;

(b) forming a second side wall smaller than said first side wall;
(c) placing said second side wall within said first side wall dividing said pot into a plurality of volumes, one within the other;
(d) placing a growing mixture within said second side wall which is conducive to early plant growth;
(e) placing a growing mixture between said first side wall and said second side wall which is conducive to the next stage of plant growth;
(f) placing a seed or a seedling in the growing mixture within said second side wall while said second side wall is positioned within said first side wall;
(g) allowing the seed or seedling to grow while containing the root growth within said second side wall for a desired length of time;
(h) removing said second side wall without moving said root structure to permit said root structure to grow into the growing mixture located around said first growing mixture.

* * * * *